United States Patent [19]
Schwartz et al.

[11] 3,847,793

[45] Nov. 12, 1974

[54] CONVERSION OF HYDROCARBONS WITH A DUAL CRACKING COMPONENT CATALYST COMPRISING ZSM-5 TYPE MATERIAL

[75] Inventors: Albert B. Schwartz, Philadelphia, Pa.; Harry A. McVeigh, Somerdale, N.J.

[73] Assignee: Mobil Oil Company, New York, N.Y.

[22] Filed: Dec. 19, 1972

[21] Appl. No.: 316,633

[52] U.S. Cl.............. 208/70, 208/74, 208/164, 252/417,
[51] Int. Cl.... C10g 11/18, C10g 37/02, B01j 11/68 C01b/33/28
[58] Field of Search................................ 208/70, 74

[56] References Cited
UNITED STATES PATENTS
2,908,630  10/1959  Friedman............................. 208/74
3,182,011  5/1965  Friedman............................. 208/78
3,186,805  6/1965  Gomory............................... 23/288
3,748,251  7/1973  Demmel et al. ...................... 208/74
3,758,403  9/1973  Rosinski et al. ..................... 208/120
3,760,024  9/1973  Cattanach........................... 260/673
3,767,568  10/1973  Chen................................ 208/134

Primary Examiner—Delbert E. Gantz
Assistant Examiner—G. E. Schmitkons
Attorney, Agent, or Firm—Andrew L. Gaboriault; Carl D. Farnsworth

[57] ABSTRACT

A method and system for converting hydrocarbons with a dual cracking component catalyst comprising ZSM-5 is described wherein the products of a large pore size cracking catalyst are passed into a dense fluid bed of catalyst comprising ZSM-5 catalyst for the production of aromatics and/or olefins suitable for alkylation with a paraffin.

11 Claims, 2 Drawing Figures

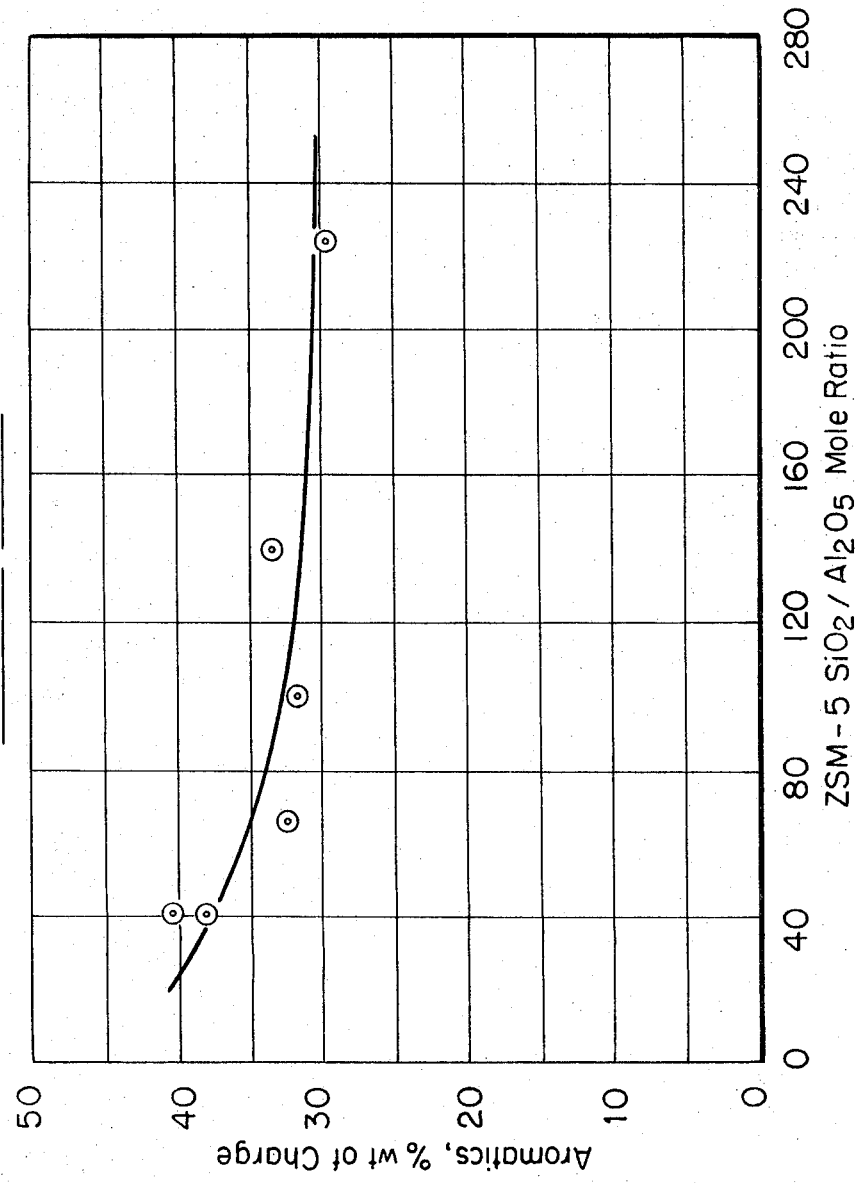

CONVERSION OF HYDROCARBONS WITH A DUAL CRACKING COMPONENT CATALYST COMPRISING ZSM-5 TYPE MATERIAL

BACKGROUND OF THE INVENTION

The field of catalytic cracking and particularly dense or dilute fluid phase catalytic operations have been undergoing progessive development since early 1940. Thus as new experience was gained in operating and design parameters, new catalyst compositions were developed which required a further refinement of known operating and design parameters so as to extract maximum efficiency from the combination operation. With the advent of high activity crystalline zeolite cracking catalyst development, we once again find ourselves in a new area of operation requiring ever further refinements in order to take advantage of the new catalyst activity, selectivity and operating sensitivity. The present invention is concerned with a combination operation which relies upon a combination of catalyst functions mutually contributing to accomplish upgrading of available refinery feed material.

SUMMARY OF THE INVENTION

The invention is concerned with the method of contacting a dual cracking component catalyst comprising ZSM-5 type material with hydrocarbons of considerably different composition and boiling range for the purpose of producing at least gasoline boiling range components. More particularly the present invention is particularly concerned with the method and combination of processing steps effected in the presence of a dual cracking component catalyst comprising a ZSM-5 type of crystalline aluminosilicate composition to obtain the conversion of gas oil, topped crudes, residual oils, a gasoline product of cracking and light gaseous hydrocarbon components comprising $C_3$ and higher boiling gaseous hydrocarbons.

In a more particular aspect, a dual cracking catalyst material comprising ZSM-5 type material, more fully discussed below, is passed under elevated temperature conditions within the range of 1,000° F. up to about 1,400° F. to the inlet of a hydrocarbon conversion zone wherein a gas oil charge material boiling above about 450° F. is cracked under relatively dispersed phase cracking conditions to form gasoline, lower and higher boiling products. The gas oil feed, preferably a virgin gas oil boiling in the range of 450° F. to about 1,100° F. initially introduced to the riser is retained in contact with the hot catalyst in the riser for a duration of time in the range of a fraction of a second up to about 3 seconds and as high as about 10 seconds during which time the combination of temperature, catalyst/oil ratio and hydrocarbon residence time are maintained to obtain a substantial conversion of the virgin feed to desired gasoline product. The catalyst/oil ratio may be in the range of 1 to about 25; the hydrocarbon residence time preferably in the range of 0.5 seconds up to about 8 seconds and the initial temperature of the catalyst and oil suspension within the range of 950° F. to about 1,250° F.

The suspension of catalyst and oil including cracked products of reaction in the riser reactor is then mixed with a higher boiling hydrocarbon material such as a recycle oil product of cracking or a heavy residual oil material in an upper portion of the riser cracking zone. In this combination the cracking component of the catalyst effecting primarily the conversion of the gas oil feed is a large pore cracking component and its activity is substantially subdued by a relatively quick deposition of carbonaceous deposits of cracking contributed by the heavier hydrocarbon charge material. Thus it may be said that the activity of the large pore gas oil cracking component is quenched by the injection of the higher boiling hydrocarbon material to the downstream portion of the riser. The suspension thus formed is then discharged into the bottom of an expanded relatively large reactor section containing a relatively dense fluid bed of the catalyst mixture herein defined. Since the riser discharges into the bottom portion of the fluid bed of catalyst maintained in the expanded reactor section it is contemplated and considered advantageous to provide a distributor grid across the lower portion of the expanded reactor section so that a more suitable distribution of the riser suspension will be distributed across the bottom of the dense bed of fluid catalyst above the distributor grid. On the other hand, a grid may not need to be employed depending on the extent of expansion to provide the dense fluid bed of catalyst.

In the catalyst system of this invention it has been found that the activity of a large pore cracking catalyst component can be substantially suppressed without undesirably deactivating the ZSM-5 type component of the catalyst and the method and system of this invention is designed to accomplish this end in particular. Thus the large pore cracking component of the catalyst and its associated matrix material is relied upon at least in part as a heat sink for promoting the reaction of the ZSM-5 type component of the catalyst. The ZSM-5 type component may be in a minor or larger proportion with respect to the larger pore cracking component or each catalyst component may be in substantially equal amounts. Accordingly the reactions promoted in the dense fluid catalyst bed formed as above defined are those chemical reactions promoted primarily by the ZSM-5 type catalyst component. These reactions may be referred to as restructuring reactions since depending on temperature conditions provided and employed, the reactions of cracking to produce $C_3$ and $C_4$ olefins and olefin cyclization are particularly promoted. Thus the time, temperature and hydrocarbon residence time available during contact in the dense fluid bed of catalyst are particularly conductive in accomplishing the restructuring reaction above defined. The hydrocarbon feed to the dense fluid catalyst bed above the riser outlet will be the effluent of the riser cracking step. However to fully utilize the small pore ZSM-5 type component of the catalyst, additional feed comprising $C_3$ and $C_4$ olefins and/or material in the gasoline boiling range may be separately introduced to the catalyst bed. This additional feed may be material separated from the effluent of the dense catalyst bed operation or such materials may be obtained from other available refinery sources. This additional feed may be introduced at substantially the bottom of the fluid bed of catalyst and/or at spaced apart intervals throughout the vertical height of the catalyst bed. The reactions catalyzed by the ZSM-5 type catalyst component preferred in the combination of this invention are those occurring within the temperature range of 900° F. up to about 1,100° F. and preferably above about 950° F. On the other hand, since the riser cracking reactions are endothermic it is contemplated providing heat to the bed of catalyst by feed preheat, indirect heat exchange with hot regenerator flue gases and/or the separate addition of hot regenerated catalyst to the dense fluid bed of catalyst. When the hot regenerated catalyst is relied upon as a source of available heat it is preferable that the large pore component of the catalyst be substantially coked by the addition of a heavy oil thereto before discharge into the catalyst bed. The dual component catalyst used as above described is stripped, regenerated and returned at a desired elevated temperature to the conversion side of the operation defined above.

The catalyst mixture and/or compositions suitable for use in this invention comprise a mixture of small pore and large pore crystalline aluminosilicate in a homogenous combination with one another or as separate discrete particles and these may be composited from substantially any high activity large pore crystalline zeolite cracking component in admixture with, for example, a ZSM-5 type of catalyst composition. The ZSM-5 type catalyst composition is a relatively small average pore diameter material smaller than, for example, a rare earth exchanged X or Y crystalline zeolite.

The large and small pore crystalline zeolites above discussed may be dispersed within a separate or a common matrix material suitable for encountering relatively high temperatures contemplated in the fluid cracking operation of this invention with its attendant catalyst regeneration operation. The catalyst mixture or composition contemplated for use in this invention will catalyze the conversion of the various components comprising the hydrocarbon feed including normal paraffins and olefins to produce for example gasoline as well as LPG types of gaseous materials. Thus the catalysts suitable for this invention have activity for cracking several different kinds and types of hydrocarbons found in gas oil and lower boiling range hydrocarbon materials in combination with a very selective cracking of normal paraffins and singly branched hydrocarbons which are restructured and/or upgraded to desired higher boiling components.

The novel process combination of this invention relies upon using a catalyst system comprising a mixture of separate catalyst particles or a homgeneous composition thereof containing at least two separate crystalline zeolite components, wherein each component acts substantially independently as herein defined upon given hydrocarbon components and each catalyst component is relied upon substantially to support the function of the other. Thus it is contemplated employing in the catalyst system of this invention, a large pore crystalline aluminosilicate having a pore size in excess of about 9 A. as a major component with the minor component being a small pore crystalline component having a maximum pore size not exceeding about 9 A. and preferably being less than about 7 A. On the other hand, the large and small pore zeolites may be used in substantially equal amounts or the smaller pore crystalline zeolite may be in a major proportion. The small pore crystalline zeolite is preferably a ZSM-5 type of crystalline material such as that described in U.S. Pat. No. 3,702,886, issued Nov. 14, 1972. The large pore crystalline zeolite may be any of the now known crystalline aluminosilicates which are suitable for cracking hydrocarbons and providing a pore size in excess of 8 A. Such a composition has the structure and capability to act upon substantially all the components usually found in a gas oil feed boiling in the range of 500° F. up to 950° or 1,100° F. Large pore zeolites of this type are well known and include naturally occurring materials or synthetic faujasite of both the X and Y type as well as zeolite L. Of these materials zeolite Y is particularly preferred.

The crystalline zeolites above identified may be exchanged, combined, dispersed or otherwise intimately admixed with a porous matrix. By porous matrix it is intended to include inorganic and organic compositions with which the crystalline aluminosilicates may be affixed. The matrix may be active or substantially inactive to the hydrocarbon conversion reactions encountered. The preferred porous matrix may be selected from the group comprising inorganic oxides such as clay, acid treated clay, silicaalumina etc. A more complete description of a catalyst composition comprising ZSM-5 type materials which may be used with advantage in this invention and their method of preparation may be found in copending applications Ser. Nos. 78,573 and 548,376 now U.S. Pat. No. 3,758,403 granted Sept. 11, 1973 and U.S. Pat. No. 3,769,202 granted Oct. 30, 1973.

The ZSM-5 type component of the catalyst can be synthesized in a wide range of silica to alumina ratios, such as 15 to 500 mole ratio and higher. The activity of the hydrogen form of ZSM-5 for cracking paraffins decreases per unit weight of catalyst with increasing silica to alumina ratio. However, as shown by Example 2, olefin aromatization activity unexpectedly declines only slightly with increasing silica to alumina mole ratios to 222 and higher. The catalyst can therefore be formulated to preferentially accomplish the most desired reactions. For example, when high yields of $C_3$ and $C_4$ hydrocarbons are desired for alkylate feed, it is preferable to use ZSM-5 with a silica-alumina mole ratio of about 15 to 100. Alternately, if it is desired to emphasize aromatization of olefins and minimize excess $C_3$ and $C_4$ hydrocarbons, it is preferable to use ZSM-5 type catalysts with a silica to alumina mole ratio of about 50 to about 300.

In the combination of this invention the small pore crystalline zeolite component of the catalyst is relied upon for promoting new ring formations and/or olefin cyclization thereof in a manner which may be made to increase with reaction severity by increasing temperatures and by increasing residence time in the range of 1 to 15 minutes.

A significant observation contributing to the operational concepts of this invention is the finding that the high temperature cracking of the gas oil feed does not significantly deactivate the activity and selectivity of a smaller pore ZSM-5 crystalline component as by coke deposition and thus particles of this compositions can function independently to perfom its unusual and desirable reaction mechanism in the overall combination operation relying upon the total mass of catalyst particles as a heat sink for promoting the encountered endothermic conversion reactions.

The small pore crystalline zeolite catalyst material preferred in the combination of this invention is preferably of the ZSM-5 type and as such the small pore has a uniform pore size varying because of its elliptical shape from about 5.5 A. up to about 6 and about 9 A.

One embodiment of this invention resides in the use of a single porous matrix material as the sole support for the two different pore size crystalline zeolites herein defined. Thus the catalyst may comprise an aluminosilicate of the ZSM-5 type dispersed with an aluminosilicate having a pore size generally larger than that of ZSM-5 and more usually greater than 8 A. in a porous matrix as a homogenous mixture in such proportions that the resulting product contains from about 1 percent up to about 95 percent by weight and preferably from about 10 to 50 percent by weight of total crystalline aluminosilicates in the final composite.

Another embodiment of this invention resides in the use of the two different pore size crystalline zeolites hereindefined in separate matrix support materials. In this embodiment the dual cracking component catalyst would be a physical mixture of separate discrete particles of the two catalysts, each containing a single crystalline zeolite cracking component. The use of separate particles of the crystalline zeolites of different pore size would facilitate the optimization of the process described in this invention by permitting relatively rapid changes in the ratio of the small pore ZSM-5 type zeolite to the larger pore size crystalline zeolite. Processing changes necessitated by variations in feed stocks and product demands could also be easily made by altering the relative addition of the two catalysts.

The particular proportions of one aluminosilicate component to the other in the catalyst system or composition herein defined is not narrowly critical and even though it can vary over an extremely wide range it has been found that the weight ratio of the ZSM-5 type aluminosilicate to the large pore size aluminosilicate can range from 1:10 up to 3:1 and preferably should be from about 1:3 to 1:1.

Hydrocarbon charge stocks which may be converted by the combination and method of this invention comprise petroleum fractions having an initial boiling point of at least 400° F. and an end point of at least 600° F. and as high as 950° to 1,100° F. The present invention also contemplates the cracking of naphtha boiling in the range of $C_5$ hydrocarbons up to about 400° F. to improve its octane rating in combination with producing significant quantities of LPG type materials which then can be used as part of the charge to the ZSM-5 contact stage of the combination. Hydrocarbons boiling above 400° F. include gas oils, residual oils, cycle stocks, whole topped crudes and heavy hydrocarbon fractions derived by destructive hydrogenation processes. These may be used alone or in combination as the first riser reactor hydrocarbon charge.

BRIEF DESCRIPTION OF THE DRAWINGS

FIG. 2 graphically depicts the effect of Si/Al ratio on propylene aromatization activity.

DESCRIPTION OF A SPECIFIC EMBODIMENT

Figure 1:
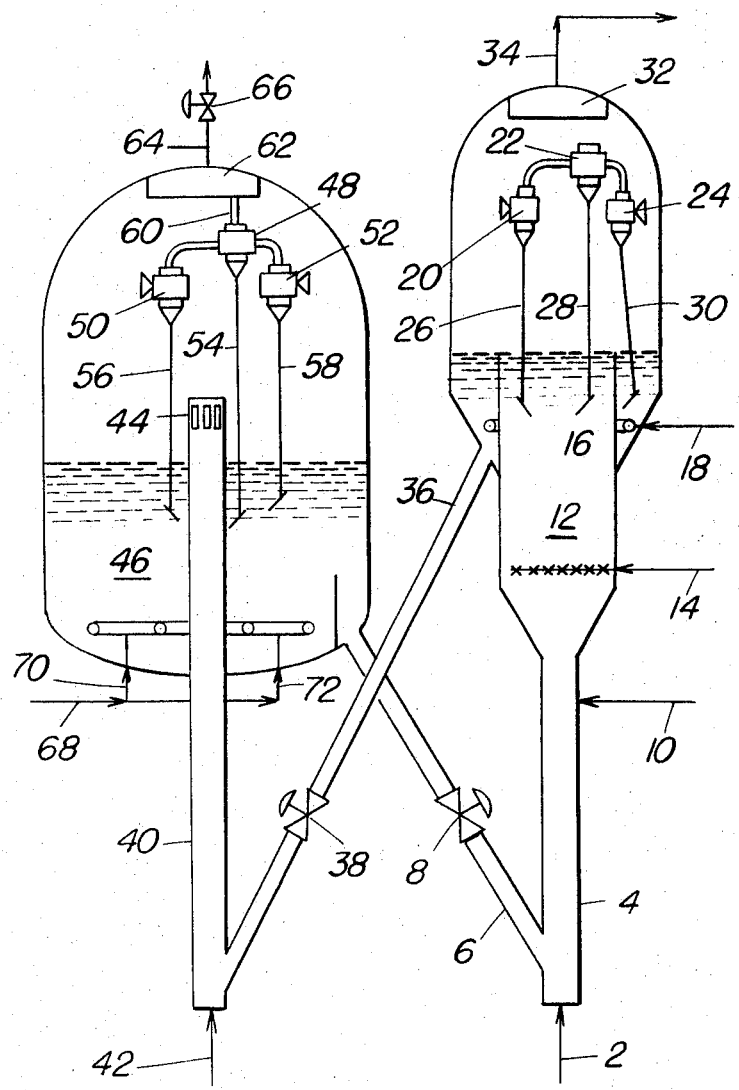
FIG. 1 diagrammatically depicts a side-by-side reactor regeneration system arranged to process different hydrocarbon feed materials over a dual cracking component catalyst under dilute and dense catalyst phase conditions and regeneration of the catalyst so used.

Referring now to FIG. 1 by way of example of a processing combination of this invention there is provided a side-by-side reactor regenerator system operating as provided in the following discussion. A hydrocarbon charge such as a virgin gas oil feed boiling in the range of 450° F. to about 1,100° F. is introduced to the base of riser reactor 4 by conduit 2. A gasiform diluent material essentially inert to the process may also be added with the hydrocarbon charge to facilitate dispersion thereof and contact with hot regenerated catalyst introduced to the base of riser 4 by conduit 6. Catalyst flow control valve 8 is provided in conduit 6. The catalyst and oil introduced to the bottom portion of riser 4 are in such proportions to provide a suspension of catalyst in oil preferably at a ratio within the range of 3 to 15. Also the temperature of the suspension is selected from within the range of 950° F. to about 1,250° F. The catalyst/oil suspension thus formed promotes the cracking of the gas oil charge to gasoline boiling components particularly by the large pore faujasite component of the catalyst thereby reducing its activity by the deposition of carbonaceous material on its active cracking sites. Under the elevated cracking condition maintained in the initial portion of the riser reactor, space velocity conditions are selected which will provide a hydrocarbon residence time in the riser section within the range of 0.5 seconds up to 8 or 10 seconds. Thereafter the initial cracking activity conditions are suppressed to a considerable extent by injecting into the suspension a heavy hydrocarbon material such as a residual oil of high coke producing characteristics by conduit 10 and in an amount which will rapidly deactivate the large pore catalyst cracking activity. The hydrocarbon catalyst suspension thus formed and being at a temperature within the range of 900° F. to 1,100° F. is then caused to move up into a dense fluid bed of catalyst 12. Gasiform reactant material comprising $C_3$ and $C_4$ hydrocarbons alone or in combination with a recycle gasoline fraction could be introduced to the dense fluid bed of catalyst by conduit 14 or at spaced apart intervals thereabove in the bed of catalyst connected to a suitable distributor arrangement or device. As mentioned above a distributor grid may be placed across the lower enlarged reactor portion housing the dense fluid catalyst bed. In the dense fluid bed of catalyst, the conversion of olefins and paraffins to lower boiling olefins and alkylbenzene and the reduction of the average molecular weight of the alkylbenzene are performed by the ZSM-5 type catalyst component within the temperature limits of 900° F. to about 1,100° F. provided by the fluid bed of catalyst and the temperature of reactant material. To maximize production of $C_3$ and $C_4$ olefins a hydrocarbon vapor residence time of 5 seconds to 1 minute is desired. To maximize cyclization of olefins a hydrocarbon residence time of 20 seconds to 5 minutes is desired. It is preferred that the dense fluid bed of catalyst be at a temperature of at least 950° F.

The fluid bed of catalyst 12 moves generally upwardly and spills over the upper extremity of retaining baffle 16 and into an adjacent catalyst stripping zone for flow downwardly therethrough and countercurrent to stripping gas introduced by conduit 18. Gasiform products of reaction above defined and stripping gas pass overhead from the catalyst into and through a plurality of cyclone separator 20, 22 and 24 provided with diplegs 26, 28 and 30. Gasiform material separated from catalyst in the cyclone separators passes from separator 22 to chamber 32 from which it is withdrawn by conduit 34 for passage to recovery equipment not shown. Stripped catalyst passing downwardly through the annular stripping zone provided is withdrawn by conduit 36 provided with flow control valve 38. Catalyst in conduit 36 is introduced to the lower portion of riser regenerator 40 wherein it is mixed with a regeneration gas introduced by conduit 42 to form a suspension which moves upwardly through the riser regenerator. In riser regenerator 40, burning of carbonaceous material is initiated and this may be aided substantially by combining hot regenerated catalyst obtained from the dense bed of catalyst in the regenerator with the catalyst passed to the lower portion of the riser regenerator 40. Therefore depending on the method of operation adopted, the temperatures in riser 40 may vary from about 900° F. up to about 1,400° F. The discharge end of riser 40 is provided with a bird cage 44 for changing the direction of flow of the suspension discharged therefrom. The discharged suspension of reduced velocity separates into a catalyst phase which falls into a dense fluid bed of catalyst 46 therebelow with the gaseous phase comprising products of combustion passing overhead and into cyclone separators 48, 50 and 52 provided with catalyst diplegs 54, 56 and 58. Regeneration flue gases pass overhead from cyclone separator 48 by conduit 60 to chamber 62 and thence to conduit 64 provided with valve 66. Regeneration gases comprising an oxygen rich gas is introduced to the lower portion of fluid bed 46 by conduit 68 feeding branched conduits 70 and 72 which are in turn connected to a suitable distributor manifold within the bed of catalyst. Regenerated catalyst is withdrawn at an elevated temperature from the dense fluid bed of catalyst 46 by conduit 6 for use in riser reactor 4 as discussed above. During regeneration of the catalyst in the dense fluid bed 46, temperature conditions are controlled within the range of 1,100° F. to about 1,400° F.

EXAMPLE 1

The concepts going to the essence of the present invention were tested using a catalyst composition containing about 15 wt. percent REY (rare earth exchanged "Y" faujasite) and 5 wt. percent ZSM-5 dispersed in a matrix as defined in Table 2. This catalyst after steam treating for 4 hours at 1,400° F. was used to crack a sour Middle East gas oil feed boiling in the range of 520° F. up to about 1,000° F. of the composition defined in Table 1, relying upon a cracking temperature of about 960° F. at a 4 catalyst to oil weight ratio and an onstream time of 2.4 minutes thereby depositing substantial amounts of carbonaceous material on the catalyst amounting up to about 2.7 wt. percent. The cracking activity of the catalyst was reduced to less than 40 percent by volume conversion by a standard test defined in Table 1 and by operating until 2.7 percent wt. carbon was deposited on the catalyst. The coked catalyst was then contacted with a commercial grade gasoline product at a temperature of about 960° F. relying upon a 5 catalyst to oil weight ratio for an hour on-stream time. The data obtained are compared in tables 2 and 3 below for results obtained using an uncoked catalyst containing only ZSM-5. With the uncoked catalyst containing only ZSM-5, the results clearly show that the ZSM-5 cracks paraffins and olefins giving predominantly $C_3$ and $C_4$ olefins, forms aromatics as shown by the increase in mols of benzene rings from $28.5 \times 10^{-2}$ in the charge to $33.7 \times 10^{-2}$ in the cracked products and reduces the average molecular weight of the alkylbenzenes. These reactions resulted in the 1.7 gasoline octane number improvement. The cracking results with the coked catalyst containing both ZSM-5 and REY show that the ZSM-5 is active even in the presence of coked catalyst and gives large amounts of $C_3$ and $C_4$ olefins by cracking paraffins and olefins in the charge. It also reduces the average molecular weight of the alkylbenzenes. These reactions resulted in a 1.6 gasoline octane number improvement. The comparison shows that the two catalysts are similar in their cracking of the gasoline feed and improvement in octane number thereof and the data show that both catalyst display shape-selective cracking in that there is no significant loss in alkyl benzenes.

The results above obtained and identified supports the concepts comprising the invention herein defined in the following manner:

a. A catalyst containing both shape-selective and non-shape selective zeolites can have its non-shape selective activity substantially reduced by coking without changing its shape selectivity activity and b. A shape-selective catalyst maintained in a dense fluid bed of catalyst will selectively crack a gasoline boiling material and increase its octane rating.

In view of the above findings, it is thus clear that the active shape selective component of the catalyst may be relied upon to perform the reactions of selective cracking and olefin cyclization provided reaction temperatures within the range of 900° to 1,100° F. are made available in combination with a proper hydrocarbon charge and residence time as herein described.

Table 1

Description of Activity Test

Properties of Sour Middle East Gas Oil Feed
(Durban FCC Fresh Feed)

| | |
|---|---|
| API | 23.8 |
| Aniline Point, °F. | 183.5 |
| Pour Point, °F. | 100 |
| Conradson Carbon, % Wt. | 0.23 |
| Sulfur, % Wt. | 2.08 |
| Total Nitrogen, % Wt. | 0.10 |
| Basic Nitrogen, ppm | 298 |
| Distillation, °F. | |
| IBP | 520 |
| 5 | 622 |
| 10 | 660 |
| 20 | 705 |
| 30 | 740 |
| 40 | 774 |
| 50 | 804 |
| 60 | 837 |
| 70 | 866 |
| 80 | 897 |
| 90 | 937 |
| 95 | 960 |
| Test Conditions | |
| Temperature, °F. | 960 |
| Catalyst/Oil Ratio, wt/wt | 4.0 |
| Weight Hourly Space Velocity | 6.25 |

Table 2

Cracking of Gasoline in Bench FCC Unit With Catalyst Containing ZSM-5

Bench FCC Conditions: Torrance Gasoline, 960°F. 5 C/O, 0.2 WHSV
(All results are wt.% charge)

| $C_6$-450°F PONA | Charge | 10% ZSM-5 in Matrix A | 15% REY and 5% ZSM-5 in Matrix B Coked to 2.7 wt.% C |
|---|---|---|---|
| Paraffins | 13.7 | 8.3 | 9.3 |
| Monocyclo Paraffins | 9.8 | 5.7 | 5.8 |
| Mono Olefins | 14.0 | 2.4 | 2.9 |
| Dicyclo Paraffins | 1.3 | 0.7 | 0.7 |
| Cy + Diolefins | 10.6 | 1.8 | 2.5 |
| $C_xH$ (2N-4) | 0.4 | 0.0 | 0.0 |
| Alkylbenzenes | 29.9 | 33.5 | 28.8 |
| Indanes + Tetralins | 8.6 | 2.9 | 3.4 |
| Naphthalenes | 2.0 | 1.2 | 1.1 |
| Alkylbenzene Dist. | | | |
| $C_6$ | 0.6 | 1.0 | 0.9 |
| $C_7$ | 3.6 | 7.1 | 5.5 |
| $C_8$ | 7.9 | 10.4 | 8.2 |
| $C_9$ | 8.6 | 8.9 | 7.9 |
| $C_{10}$ | 4.2 | 3.7 | 3.8 |
| $C_{11}$ | 3.3 | 1.9 | 2.0 |
| $C_{12}$ | 1.4 | 0.5 | 0.5 |
| $C_{13}$ | 0.3 | 0.0 | 0.0 |
| mols Benzene $\times 10^2$ | 28.5 | 33.7 | 28.6 |

Matrix A - 58% wt. $SiO_2$, 2 % Wt. $ZrO_2$, 40% wt. clay.
Matrix B - 61% wt. $SiO_2$, 2% wt. $ZrO_2$, 34% wt. clay, 3% wt. rare earth oxides.

Table 3

Cracking of Gasoline in Bench FCC Unit with Catalysts Containing ZSM-5

Bench FCC Conditions: Torrance Gasoline, 960°F. 5 C/O, 0.2 WHSV (All results are wt. % charge)

| | Charge | 10% ZSM-5 in B-9B Matrix | 5% ZSM-5 in D-10 Coked to 2.66 wt.% C |
|---|---|---|---|
| $C_6^-$ | 9.7 | 32.4 | 34.2 |
| $C_6$-450°F | 90.3 | 56.5  54.5 | |
| 450°F + | 0.0 | 7.3 | 8.7 |
| Coke | — | 3.8 | 2.6 |
| $C_5$-450 RON Clear | 93.7 | 95.4 | 95.3 |
| Lt. Prod. Dist. | | | |
| $H_2$ | 0.0 | 0.36 | 0.34 |
| $C_1$ | 0.0 | 2.78 | 3.67 |
| $C_2^=$ | 0.0 | 2.39 | 1.29 |
| $C_2$ | 0.0 | 1.80 | 2.42 |
| $C_3^=$ | 0.24 | 8.70 | 5.81 |
| $C_3$ | 0.19 | 2.57 | 4.08 |
| $iC_4$ | 0.56 | 3.07 | 3.11 |
| $C_4^=$ | 2.20 | 6.38 | 6.20 |
| $nC_4$ | 0.37 | 0.74 | 1.13 |
| $iC_5$ | 1.59 | 1.74 | 2.27 |
| $C_5^=$ | 4.09 | 1.45 | 3.30 |
| $nC_5$ | 0.46 | 0.35 | 0.53 |
| $H_2S$ | 0.0 | 0.04 | 0.09 |

EXAMPLE 2

This example illustrates the capability of the ZSM-5 type component to aromatize light olefins. The catalysts were 28 to 60 mesh composites of 65 percent wt. of the hydrogen form of ZSM-5 (prepared by thermal decompositions of $NH_4$—ZSM-5) and 35 percent Wt. alumina binder. Several catalysts were prepared using ZSM-5 of different silica to alumina ratios. Propylene was passed over each catalyst at 1 WHSV at 900° F. for 1 hour, and the aromatics produced were measured. FIG. 2 shows the results of these tests. It is evident that acid ZSM-5 very effectively converts propylene to aromatics over a wide range of catalyst silica-alumina ratios.

Having thus provided a general discussion of the method and concepts of this invention and specifically identified examples in support thereof, it is to be understood that no undue restrictions are to be imposed by reasons thereof except as defined in the following claims.

We claim:

1. In a process tor converting hydrocarbons in the pressence of fluidized catalyst particles and regeneration of the catalyst particles the method for improving the production of high octane gasoline boiling range materials, which comprises a. circulating in the hydrocarbon conversion catalyst regeneration process a catalyst composition comprising a mixture of a large pore size crystalline aluminosilicate cracking component in combination with a ZSM-5 type of crystalline aluminosilicate, b. contacting regenerated catalyst as a suspension under elevated temperature cracking conditions within the range of 1,000° F. to 1,400° F. initially with a hydrocarbon feed boiling above gasoline end point material up to about 1,100° F. in the initial portion of a riser conversion zone and then with a higher coke producing hydrocarbon feed in a downstream portion of the riser conversion zone under conditions to selectively coke deactivate substantially only the large pore component of the catalyst, c. passing the suspension with coke deactivated large pore crystalline cracking component in combination with the ZSM-5 component upwardly into the lower portion of a dense fluid bed of said catalyst maintained at a temperature in the range of 900° F. up to about 1,100° F., d. recovering hydrocarbon products of conversion from said dense fluid catalyst bed enriched in gasoline boiling range materials by ZSM-5 conversion of gasiform olefinic hydrocarbons, and e. passing catalyst from said fluid bed through catalyst stripping and regeneration before return in a heated condition to the riser hydrocarbon conversion zone.

2. The process of claim 1 wherein the silica to alumina mole ratio of the ZSM-5 type crystalline component is within the range of 15 to 100 to promote conversion of the hydrocarbon feed and $C_3$ and $C_4$ olefins to high octane gasoline product at a vapor contact time in the range of 5 seconds to 1 minute.

3. The process of claim 1 wherein the silica to alumina mole ratio of the ZSM-5 type crystalline component is within the range of 50 to 300 to provide conversion to high yields of high octane gasoline product by aromatization of olefins at a vapor contact time in the range of 20 seconds to 5 minutes.

4. The process of claim 1 wherein the temperature of the dense fluid bed of catalyst is supported by the addition of hot regenerated catalyst after deactivation with carbonaceous material the large pore component of the catalyst.

5. The process of claim 1 wherein the dense fluid catalyst bed temperature is supported by indirect heat exchange with regeneration flue gases.

6. The process of claim 1 wherein the dense fluid catalyst bed temperature is supported in part by preheating of added reactant feed.

7. The process of claim 1 wherein the catalyst circulated comprises particles of the large pore crystalline zeolite dispersed in matrix material separate from ZSM-5 type material dispersed in a suitable matrix.

8. The process of claim 1 wherein the catalyst particles circulated comprise a homogenous mixture of large pore crystalline aluminosilicate and ZSM-5 type crystalline aluminosilicate.

9. The process of claim 1 wherein the dense fluid bed of catalyst is contacted with an additional hydrocarbon feed rich in $C_3$ and $C_4$ hydrocarbons to form alkyl aromatics.

10. A method for producing high octane gasoline by the combination of catalytic cracking and olefin aromatization which comprises passing a hydrocarbon feed boiling above gasoline boiling material in contact with a catalyst mixture comprising a faujasite cracking component and a ZSM-5 type crystalline material to form a suspension at a hydrocarbon feed cracking temperature in the range of 1,000° F. up to about 1,400° F., contacting the suspension thus obtained after a hydrocarbon residence time up to about 10 seconds with a high coke producing residual oil in an amount to obtain a substantial further deactivation of the faujasite cracking component, passing the suspension with deactivated faujasite cracking component into an expanded reaction section containing a dense fluid bed of catalyst maintained at a temperature within the range of 900° F. up to about 1,100° F. and charging additional hydrocarbons comprising $C_3$ and $C_4$ olefins to said fluid bed of catalyst under conditions to obtain increased cyclization of formed and charged olefins to aromatic product.

11. The method of claim 10 wherein a naphtha boiling in the range of $C_5$ hydrocarbons up to about 400° F. is subjected to cracking with the mixed catalyst composition.

* * * * *

UNITED STATES PATENT OFFICE
CERTIFICATE OF CORRECTION

Patent No. 3,847,793          Dated November 12, 1974

Inventor(s) ALBERT B. SCHWARTZ and HARRY A. McVEIGH

It is certified that error appears in the above-identified patent and that said Letters Patent are hereby corrected as shown below:

Column 2, line 48 : "conductive" should be --conducive--

Column 4, line 64 : After "9A." add --units--

Column 5, line 4 : After " 8 A." add --units--

Column 9, Table 3 : Under column "10% ZSM-5 in B-9B Matrix", second line, cancel "54.5" and add under next column - "5% ZSM-5 in D-10 Coked to 2.66 wt.% C", second line, --54.5--

Signed and sealed this 4th day of February 1975.

(SEAL)
Attest:

McCOY M. GIBSON JR.
Attesting Officer

C. MARSHALL DANN
Commissioner of Patents